United States Patent [19]

Groen

[11] Patent Number: 4,865,856
[45] Date of Patent: Sep. 12, 1989

[54] METHOD OF TEMPERING EDIBLE COMPOSITIONS

[75] Inventor: John W. Groen, Hagley, England

[73] Assignee: Cadbury Limited, Birmingham, England

[21] Appl. No.: 10,722

[22] Filed: Feb. 4, 1987

[30] Foreign Application Priority Data

Feb. 6, 1986 [GB] United Kingdom ............... 8602946

[51] Int. Cl.⁴ .................... A23G 1/18; G01N 33/02
[52] U.S. Cl. ................................. 426/231; 426/524; 426/660
[58] Field of Search .............. 426/231, 660, 613, 524

[56] References Cited

U.S. PATENT DOCUMENTS

| | | | |
|---|---|---|---|
| 3,215,192 | 11/1965 | Sollich | 165/17 |
| 3,638,553 | 2/1972 | Kreuter | 426/524 |
| 3,777,807 | 12/1973 | Carroll | 165/26 |
| 4,238,516 | 12/1980 | Kreuter | 426/231 |
| 4,421,779 | 12/1983 | Baker et al. | 426/660 |
| 4,468,409 | 8/1984 | Metzroth | 426/660 |

FOREIGN PATENT DOCUMENTS

| | | |
|---|---|---|
| 2322838 | 5/1973 | Fed. Rep. of Germany . |
| 2450515 | 10/1974 | Fed. Rep. of Germany . |
| 945083 | 12/1963 | United Kingdom . |
| 1080782 | 8/1967 | United Kingdom . |
| 1183125 | 3/1970 | United Kingdom . |
| 1564363 | 4/1980 | United Kingdom . |

*Primary Examiner*—George Yeung
*Attorney, Agent, or Firm*—Fleit, Jacobson, Cohn, Price, Holman & Stern

[57] ABSTRACT

A method of tempering edible fatty compositions such as chocolate comprises controlling the temperature of the composition to a predetermined temperature, passing the temperature-controlled composition continuously through a heat exchanger, cooling the composition, monitoring the consistency of the composition, and using the results to control the cooling of the composition in the heat exchanger, the monitoring being effected by measuring the pressure difference across the heat exchanger using pressure transducers, measuring the load on a motor used for mixing or stirring the composition in the heat exchanger, or by measuring the viscosity of the composition with an in-line viscometer.

14 Claims, 4 Drawing Sheets

METHOD OF TEMPERING EDIBLE COMPOSITIONS

BACKGROUND OF THE INVENTION

1. Field of the Invention

The present invention relates to a method of tempering edible compositions containing crystallizable fatty material, e.g. confections such as chocolate.

2. Description of the Prior Art

Confections such as chocolate contain crystalline fat when solid and, especially in the case of chocolate, this fat can be present in various polymorphic forms depending on how the confection has been cooled. In order that the confection has an acceptable texture and appearance, it is necessary to control the size and distribution of the fat crystals throughout the confection. This is normally done by a process of cooling the confection in its liquid state while stirring continuously to produce seed crystals of fat distributed through the mass of the confection. This process is referred to as tempering.

Chocolate tempering is commonly effected in an automatic tempering machine when the liquid chocolate is constantly stirred while being cooled to a temperature of about 27°-29° C., depending upon the type of chocolate, to promote the formation of fat crystals of a desired form and size. Following this, the chocolate, after slight heating to facilitate pumping, is passed to a depositor from where it is fed into molds. After molding, the chocolate is cooled to effect solidification. This type of process can have an adverse effect on the carefully developed fat crystal form and size with the result that a chocolate "bloom" can occur which detracts from the appearance of the chocolate. In an effort to mitigate this problem, it has been previously proposed in British patent specification Nos. 945083 and 1183125 to temper chocolate by supercooling it in the liquid form under high pressure while constantly stirring it to prevent solidification. In such a process, the chocolate is cooled to about 25° C., has a low viscosity and is then immediately discharged into molds where it sets very quickly with minimal additional cooling.

BRIEF SUMMARY OF THE INVENTION

The applicants have found that such a tempering process is potentially suitable for producing high viscosity chocolate in a form suitable for extrusion to the desired shape, but that very careful control is required to obtain a uniform consistency. The Applicants have found that monitoring only the temperature of the chocolate being cooled does not give adequate control over the form of the chocolate to enable consistent results to be achieved on extrusion. However, it has been found that if the consistency of the chocolate being tempered is monitored to give an indication of the amount of cooling required, this allows greater control and the process can then be used for the production of chocolate having an extrudible consistency, which is quick setting and which can maintain its extruded shape when setting without the use of a mold.

According to the present invention, there is provided a method of tempering a liquid edible composition containing crystallizable fatty material, comprising the steps of cooling the edible composition in a tempering zone, monitoring the consistency of the composition, and utilizing this to control cooling of the composition in said tempering zone.

The method according to the present invention is preferably applied to a continuous tempering process to maintain a constant consistency in the composition discharged from such a process. Thus, it is preferred to feed the composition to be tempered continuously to the tempering zone in which said cooling step is effected and to remove the composition which has been tempered from the tempering zone continuously while controlling the cooling so that the composition which is removed has a predetermined clay-like consistency capable of retaining its form after extrusion.

The consistency of the composition can be measured using an in-line viscometer downstream of the tempering zone in which said cooling step is effected. For example, a Brookfield digital viscometer may be used. Such a viscometer is an example of the continuously sensing rotational type of viscometer and measures viscosity by sensing the torque required to rotate a spindle (or mixing element) at a constant speed while immersed in the composition. The digital type is particularly convenient as it provides a 0-10 mV output signal which is proportional to viscosity and hence the consistency. Conveniently, the output signal is amplified and applied to a coolant temperature controller which is of the cascade type so that the coolant temperature is varied as a result of variations in the consistency of the chocolate. Alternatively, the output signal can be employed to control the coolant flow rate.

In another example, a Seres viscometer can be employed. With such a viscometer, the composition, after being subjected to the cooling step, is pumped through a U-shaped tube with a differential pressure transducer connected across the ends of the tube. The transducer consists of two diaphragms which are respectively mounted on the inlet and the outlet of the U-tube. A piezoelectric crystal is located between the diaphragms. The transducer provides a 4-20 mA output signal proportional to the viscosity. The signal, after amplification, can be used to control the coolant as described in the previous embodiment.

The tempering zone in which cooling is controlled in accordance with consistency may be provided in a heat exchanger such as a scraped surface heat exchanger or a screw-type heat exchanger. The whole or part of the heat exchanger may be occupied by the tempering zone in which cooling is controlled by monitoring viscosity. In the case where the whole of the heat exchanger is occupied by the tempering zone, it is preferred for the composition to have been passed previously through another heat exchanger in which the temperature of the composition is monitored so that the temperature of the composition being passed to the cooling step is accurately controlled. In the case where the tempering zone does not occupy the whole of the heat exchanger, then temperature control of the composition can be effected within the same heat exchanger before the composition reaches the tempering zone.

As an alternative to monitoring consistency using an in-line viscometer, the consistency of the composition can be monitored by monitoring the resistance to mixing of the composition in the cooling zone or by monitoring pressure difference across the cooling zone.

The resistance to mixing of the composition can be monitored by monitoring for example the torque applied to a drive shaft or by monitoring the power consumption of a motor used for mixing, e.g. by monitoring the motor current. However, it is preferred to effect such monitoring by monitoring the voltage in constant speed control equipment for a mixer motor. Such a technique is suitable in the case where the motor is used exclusively to effect mixing in said tempering zone.

In the case where a screw-type heat exchanger is employed to effect the cooling step, it may be equipped with a single screw or a counter - or co-rotating double screw (usually with interrupted flights to reduce the inherent pumping action) and may have a barrel which is split into one or more zones, typically six zones. In the case of a single zone, this will constitute the tempering zone. In the case of a multi-zone barrel, at least the final zone will be the tempering zone. Each zone can be cooled by a separate coolant supply. Alternatively, two or more of the zones can be linked and coolant passed therethrough in series, preferably in countercurrent fashion relative to the flow of the composition through the zones. Countercurrent coolant flow is preferred because it minimizes the temperature difference between the coolant and the composition. Any number of zones may be connected in series or exist separately, as required, in respect of the supply of coolant thereto, provided that the required cooling control in the tempering zone can be effected.

To facilitate control of the consistency of the tempered composition, it is preferred first to stabilize the temperature of the composition being passed to the tempering zone to within about 1° C. of a predetermined temperature. To facilitate control, it is desirable for the composition initially to contain no solid fat crystals, i.e. it is in a completely de-tempered state.

In the case of monitoring the consistency of the cooling composition by monitoring the pressure difference across the tempering zone, it has been found that the viscosity of the composition increases as the fat starts to solidify and the temperature is decreased. Consequently, the pressure difference across the tempering zone also increases as the viscosity increases and therefore provides a measure of the consistency of the composition being tempered. The pressure difference is conveniently monitored using pressure transducers fitted to the inlet and the outlet of the tempering zone.

In the case of a heat exchanger such as a scraped surface heat exchanger or a double screw type (eg a THERMASCREW heat exchanger ex Henry Balfour & Co. Ltd of Fife, Scotland), pressure difference across the tempering zone can be monitored using pressure transducers of the strain gauge type. For example, Schaevitz P301-0001-050M pressure transducers can be located in the pipework immediately before and after the tempering zone in the heat exchanger, and connected to a control unit which provides an excitation voltage of 10 V for the pressure transducers. A 4–20 mA output signal, proportional to pressure, is obtained. The outlet pressure signal is inverted and combined with the inlet pressure signal to give a signal which is proportional to the pressure difference. The signal is then amplified to give a 0–10 V signal which is passed to a coolant temperature controller of the cascade type (i.e. pressure difference controls set point of coolant which controls a coolant injection valve) so that the temperature of the coolant for the tempering zone is varied as a result of variations in the consistency of the composition being tempered.

The method of tempering according to the present invention is suitable for the preparation of chocolate into a form where it can be extruded in a controlled manner, the extrudate retaining its shape on leaving the extrusion die. Thus, the chocolate after tempering in accordance with the present invention, can be passed in super cooled form under pressure through an extrusion die so that after passage therethrough, the chocolate rapidly solidifies to produce an extruded shape whose cross-sectional form is determined substantially by that of the extrusion die.

In a preferred method of extruding chocolate, liquid chocolate is continuously pumped at a substantially constant rate under pressure, e.g. about 5 bar, to a first heat exchanger where the temperature is reduced to 34° C. ±1° C. From there the chocolate is pumped, still under pressure, to a second heat exchanger where it is tempered in accordance with the present invention to a clay-like consistency which will allow the extruded form to retain its shape. The resultant chocolate at this stage is typically at a temperature of about 25° C. and is suitable for extrusion.

In the first heat exchanger, control of cooling is effected by monitoring the temperature of the chocolate leaving the first heat exchanger, in contrast to the control in accordance with chocolate consistency which takes place in the second heat exchanger.

The techniques of the present invention are applicable not only to chocolate and chocolate-like compositions, which typically have a fat content of 25 to 36 percent by weight, but also to other confectionery compositions containing crystallizable fatty material, e.g. having a total fat content of about 10 to 85 percent by weight.

Typically, the chocolate composition consists of 5 wt percent non-fat cocoa solids, 22 wt percent cocoa butter, 27 wt percent milk solids, 45 wt percent sugar, 0.6 wt percent emulsifier and flavoring and 0.4 wt percent water. Such a composition is used in the methods disclosed in the illustrated embodiments described below.

BRIEF DESCRIPTION OF THE DRAWINGS

Embodiments of the present invention will now be described, by way of example, with reference to the accompanying drawings wherein.

DETAILED DESCRIPTION

Figure 1:
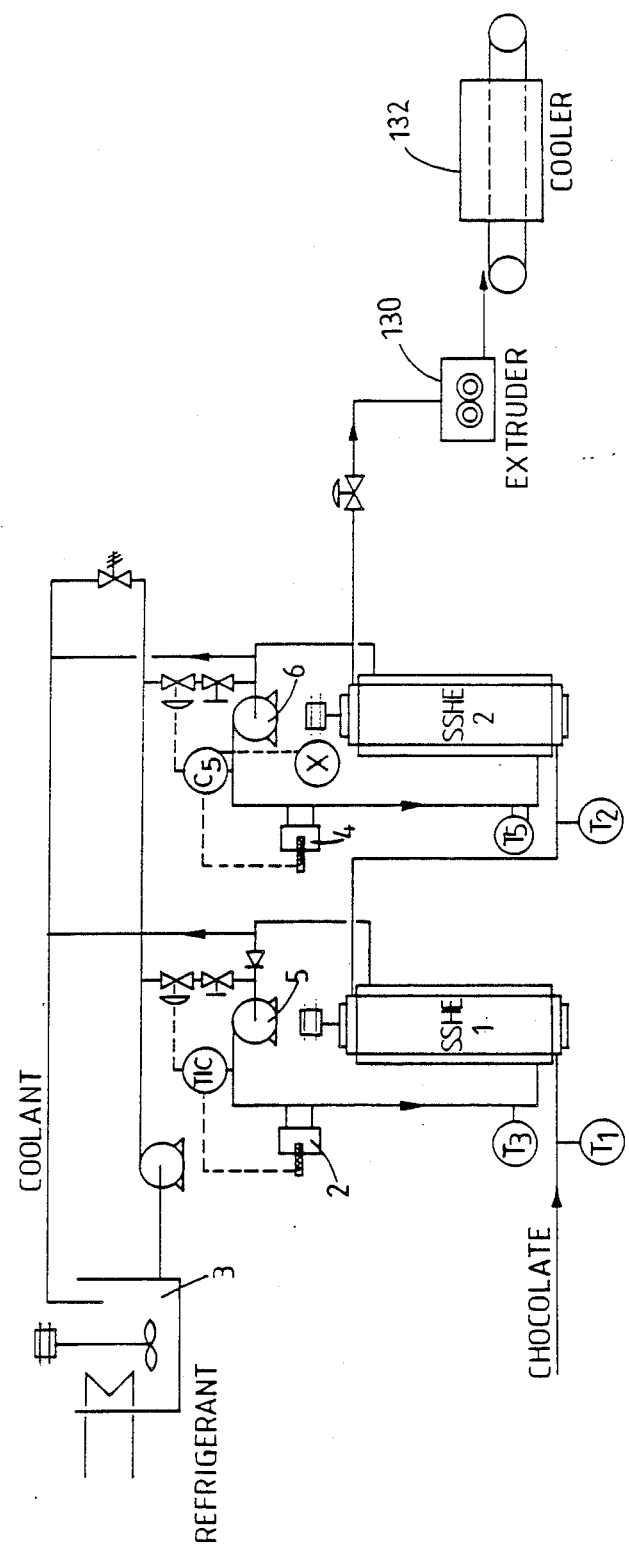
FIG. 1 is a process line diagram of one scheme for the production of extruded quick-setting chocolate.

Referring now to FIG. 1, untempered chocolate at 45° C. is pumped from a stirred and heated chocolate storage vessel (not shown) using a triple screw pump (also not shown) at a rate of 340 Kg.hr$^{-1}$ and a pressure of 5 bar into a first scraped surface heat exchanger (S.S.H.E. 1). In this embodiment, S.S.H.E. 1 is of the type sold under the Trade Mark "VOTATOR". S.S.H.E. 1 is provided with a motorized stirrer rotated at 100 r.p.m. and a heat exchange jacket. The heat exchange jacket is connected to a heat transfer system in which the heat transfer medium or coolant which is circulated in a closed loop by means of a pump 5 has its temperature varied by using electric heaters 2 or steam, or by injecting coolant at 0° C. from a chiller unit 3.

The chocolate is partly cooled in S.S.H.E. 1 and the outlet temperature is stabilized to within 1° C. of the desired temperature (34° C.). A cascade control system is used on the heat transfer system to maintain the desired chocolate outlet temperature ($T_2$). The temperature ($T_3$) of the coolant in the loop is controlled by monitoring the chocolate outlet temperature ($T_2$) and in addition the chocolate inlet temperature ($T_1$) is taken into account using a feed forward loop.

The partly cooled chocolate is then pumped to a second scraped surface heat exchanger S.S.H.E. 2 which, in this embodiment, is the same type as S.S.H.E. 1 and which is operated within a narrow temperature band to prevent the chocolate setting yet provide a chocolate having a clay-like consistency such that the chocolate will maintain its shape when extruded. Heat exchanger S.S.H.E. 2 has a closed loop coolant circuit around which the coolant is pumped by a pump 6 and has an associated heater 4. Coolant at 0° C. from the chiller unit 3 can be injected into the circuit.

The chocolate is supercooled in S.S.H.E. 2 to 25.2° C. to achieve the desired clay-like consistency.

The consistency is measured by monitoring the torque exerted on the stirrer by the chocolate. In this embodiment, the stirrer is rotated at a speed of 120 r.p.m., the torque setting of the motor is 52 percent of maximum and the actual torque of the motor is 308 Nm.

It is convenient to utilize a variable frequency speed controller (X) to maintain a preset rotor speed irrespective of load. The speed controller is a static frequency converter consisting of a rectifier which, by means of a voltage regulator, converts mains voltage to a variable d.c. voltage. The d.c. voltage is taken through a measuring circuit to an inverter, where again it is converted to a three phase alternating voltage. The controller is arranged to provide a 0–500 mV.D.C signal which is proportional to the motor power and as the speed is accurately controlled, is therefore proportional to the torque and hence the consistency of the chocolate. The signal is superimposed on a high frequency carrier voltage and therefore has to be isolated before it is used. It will be appreciated that other methods of measuring the torque can be utilized.

The 0–500 mV.D.C signal from the speed controller (X) is amplified and applied to the coolant temperature controller C5 which again is of the cascade type so that the coolant temperature ($T_5$) is varied as a result of variations in the consistency of the chocolate. Once the required consistency is achieved, the chocolate is pumped to an extrusion die (typically as described in co-pending British application No. 8602950, filed 6th February, 1986, corresponding to co-pending U.S. patent application Ser. No. 07/239,079, filed September 1, 1988, which is a continuation of application Ser. No. 07/010,721, filed February 4, 1987, now abandoned) where it is extruded onto a cooling belt and cut to size.

Figure 2:
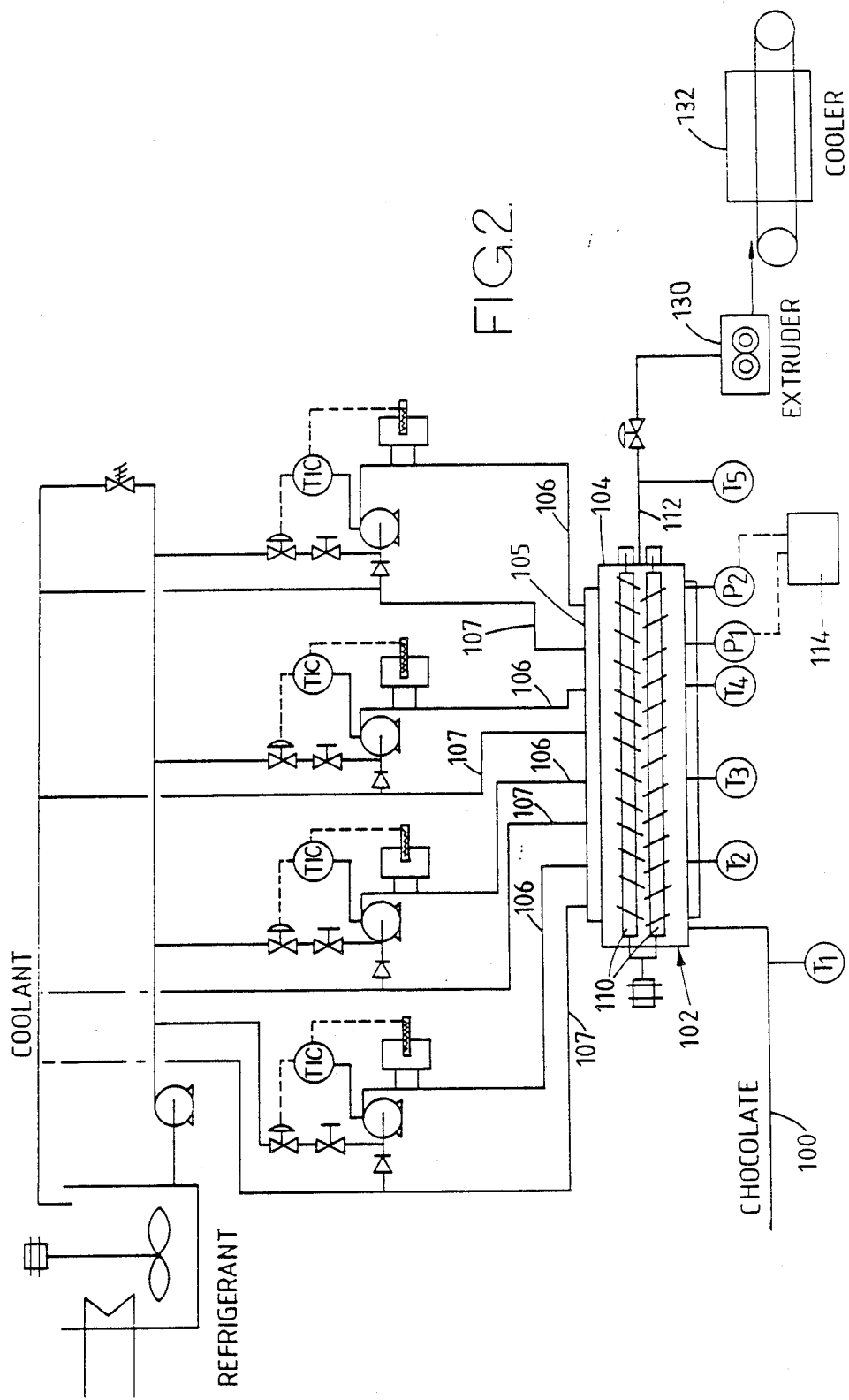
FIG. 2 is a process line diagram showing a second scheme for the production of extruded quick-setting chocolate.

Referring now to FIG. 2, untempered chocolate at a temperature of $T_1$ of about 45° C. is pumped at a pressure of greater than 1 bar along inlet line 100 to tempering vessel 102 which, in this embodiment, takes the form of a double screw type heat exchanger having a barrel 104 fitted with a cooling jacket 105 divided into a plurality of separate zones each having a respective inlet 106 and outlet 107 for coolant. For the sake of simplicity only four zones are shown, although six zones will usually be provided. The barrel 104 contains a pair of parallel screws 110 which are mounted in the barrel 104 for counter rotation. The arrangement is such that rotation of the screws 110 causes chocolate composition which has been introduced into the barrel 104 through inlet line 100 to be continuously mixed and impelled through the zones towards the opposite end of the barrel 104 at which an outlet line 112 is provided. As it passes through the first zone, the chocolate is partly cooled and the temperature thereof is stabilized to within 1° C. of the desired temperature. A cascade control system is employed to maintain the desired chocolate temperature T2. The temperature of the coolant in the loop associated with the first zone is controlled by monitoring the chocolate temperature T2, and also the chocolate inlet temperature T1 is taken into account using a feed forward loop in a similar manner to that described in FIG. 1 for temperature control in S.S.H.E.1. The partly cooled chocolate is then further cooled in a similar manner in the second and third zones, but without using the feed forward loop. In FIG. 2, T3 is the temperature of chocolate leaving the second zone and entering the third zone, whilst T4 is the temperature of chocolate leaving the third zone.

The partly cooled chocolate from the third zone is then further cooled in the fourth or final zone which constitutes the tempering zone controlled in accordance with the teachings of the present invention. The consistency of the chocolate is controlled by maintaining a constant pressure drop across the final zone. The speed of screws 110 is controlled so that the pressure drop across the system is less than 1 bar overall, i.e. pump pressure. The pressures in the region of the final or tempering zone are measured using Dynisco pressure transducers P1 and P2 which are inserted into the barrel 104 so as to be flush with the internal surface of the barrel 104. Transducer P1 is disposed at the inlet to the final zone, whilst transducer P2 is disposed at the outlet to the final zone. The transducers P1 and P2 operate on the strain gauge principle. A control unit 114 provides an excitation voltage of 10 V. An output signal in the range of 4–20 mA is obtained, the value of which is proportional to the pressure. The outlet pressure signal from transducer P2 is inverted and combined with the inlet pressure signal from transducer P1 to give a combined signal corresponding to the pressure difference. This signal is amplified to give a signal in the 0–10 V range which is then utilized to control a coolant temperature controller associated with the final or tempering zone. This coolant temperature controller is of the cascade type so that the coolant temperature is varied as a result of variations in the consistency of the chocolate.

In the above embodiment, the coolant flow rate through each zone is 180 l. min$^{-1}$, the throughput of chocolate is 340 Kg. hr$^{-1}$, pump pressure is less than 1 bar, T1 is 45° C., T2 is 39° C., T3 is 34° C., T4 is 29° C. and T5 is 25.2° C.

Chocolate which is discharged from the barrel 104 via line 112 has a clay-like consistency and is passed to extruder 130 which is fitted with an extrusion die (typically as described in co-pending application Ser. No. 07/239,079 filed September 1, 1988, supra) where it is extruded onto cooling belt 132 and then cut transversely to the desired length.

Figure 3:
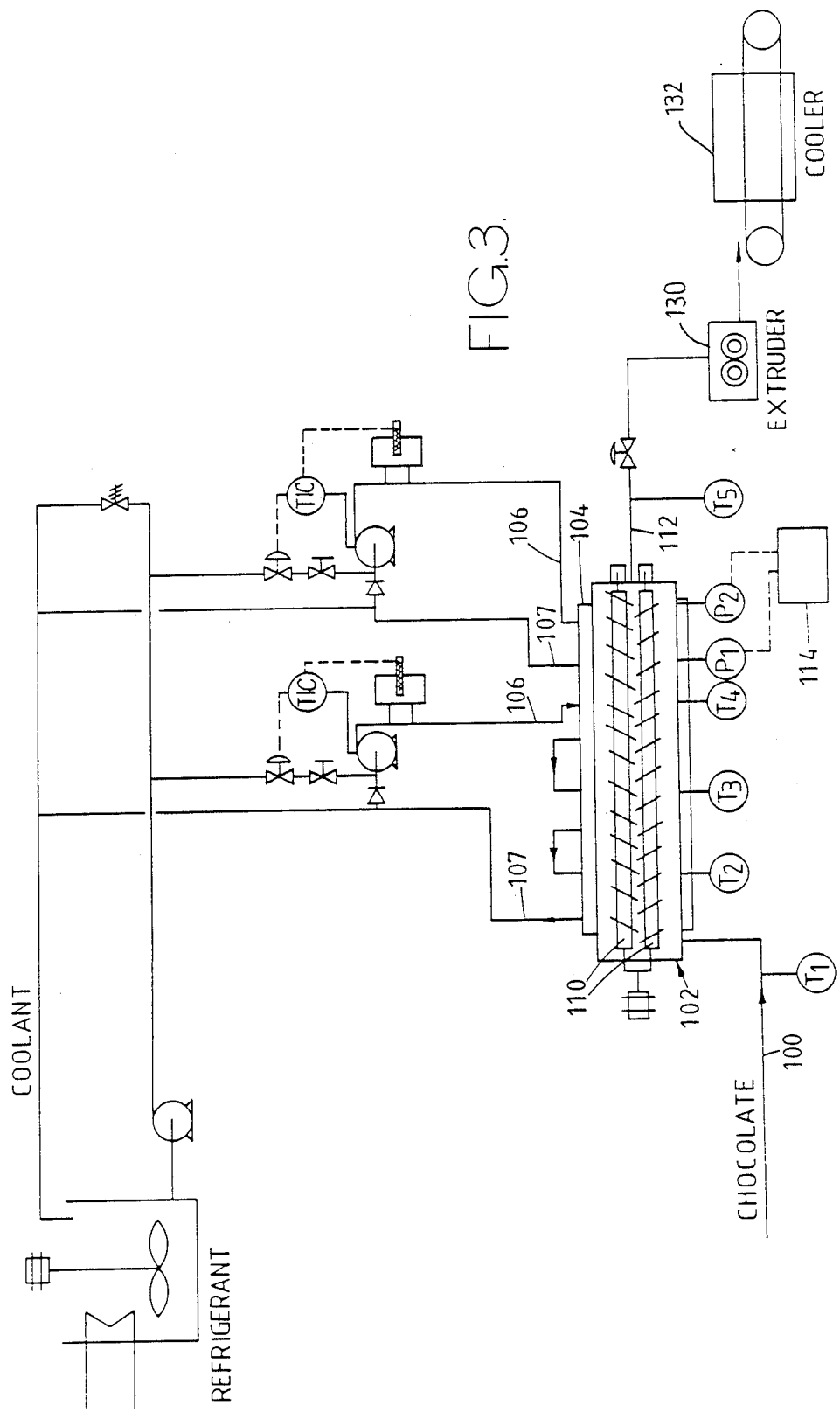
FIG. 3 is a process line diagram showing a third scheme for the production of extruded quick-setting chocolate.

Referring now to FIG. 3, the system illustrated therein is similar to that of FIG. 2 and similar parts are accorded the same reference numerals. In this embodiment, however, the coolant is arranged to flow serially through zones 1 to 3 in countercurrent fashion to the flow of chocolate, the coolant being first fed to the inlet of zone 3. A cascade control system is used to maintain the desired chocolate temperature (T4). The temperature of the coolant in the loop is controlled by monitoring the chocolate temperature (T4) and in addition the chocolate inlet temperature T1 is taken into account using a feed forward loop. Otherwise, the operating conditions are the same as for the system of FIG. 2.

Figure 4:
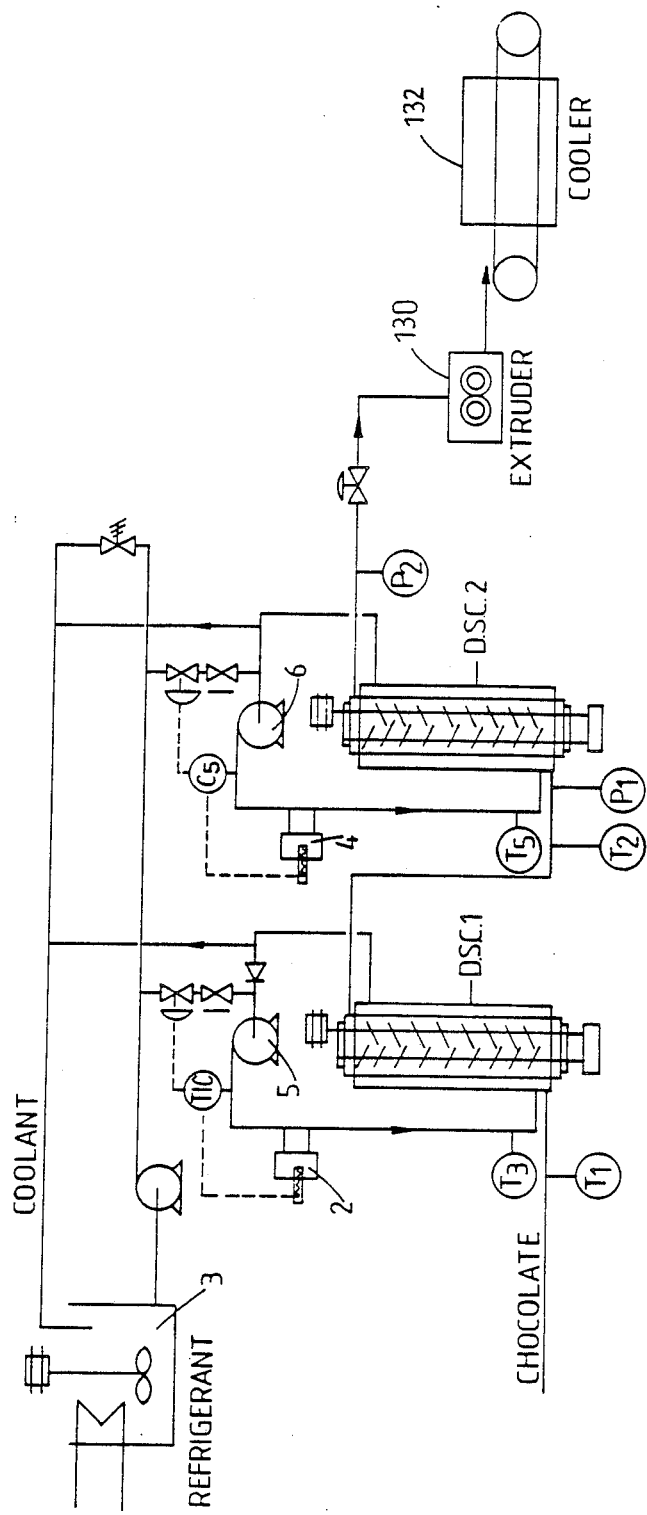
FIG. 4 is a process line diagram showing a fourth scheme for the production of extruded quick-setting chocolate.

Referring now to FIG. 4, the system illustrated therein is similar to that of FIG. 1 and similar parts are accorded the same reference numerals. In this embodiment, however, the scraped surface heat exchangers S.S.H.E.1 and S.S.H.E.2 are replaced by double screw-type heat exchangers D.S.C.1 and D.S.C.2 which are similar to the double screw heat exchanger 102 of FIGS. 2 and 3 except that each has only a single coolant zone. The temperature of the chocolate in D.S.C.1 is controlled in a similar way to that described for S.S.H.E. 1 in the embodiment of FIG. 1, while the tempering of the chocolate in D.S.C.1 is controlled in a similar way to that described for zone 4 in heat exchanger 102 in the embodiment of FIG. 2.

In the embodiment of FIG. 4, the conditions are typically as follows:

$T_1 = 45°$ C.
$T_2 = 34°$ C.
Chilled coolant temperature in each of D.S.C.1 and D.S.C.2 = 0° C.
Coolant flow rate in each of D.S.C.1 and D.S.C.2 = 180 l.min$^{-1}$
Pressure difference = 0 to 1 bar.

I claim:

1. A method of tempering a liquid edible composition containing crystallizable fatty material comprising:
   providing a tempering zone;
   placing the composition in said tempering zone;
   cooling the composition in said tempering zone;
   monitoring the consistency of the composition during said cooling; and
   controlling said cooling in response to the consistency determined by said monitoring.

2. A method as claimed in claim 1 and further comprising:
   continuously feeding said composition to said tempering zone; and
   continuously removing said composition after tempering from said tempering zone.

3. A method as claimed in claim 1 and further comprising:
   extruding the cooled composition to form an extruded solidified product.

4. A method as claimed in claim 2 and further comprising:
   extruding the cooled composition to form an extruded solidified product.

5. A method as claimed in claim 4 wherein said controlling comprises:
   controlling said cooling so that the composition removed from said tempering zone has a pre-determined clay-like consistency capable of substantially retaining the form produced by said extruding.

6. A method as claimed in claim 1 and further comprising:
   removing the composition from said tempering zone; and
   monitoring the consistency of the composition after removal thereof from said tempering zone.

7. A method as claimed in claim 6 wherein:
   said monitoring comprises passing the cooled composition through a viscometer to determine the viscosity thereof and producing an output signal from the viscometer preportional to the consistency of the composition passing therethrough; and
   said controlling comprises controlling the amount of cooling in response to said output of the viscometer.

8. A method as claimed in claim 1 wherein said monitoring further comprises:
   measuring the pressure difference across the temperature zone between the positions where the composition is fed to and removed from the tempering zone.

9. A method as claimed in claim 1 wherein said monitoring further comprises:
   mixing the composition in the tempering zone; and
   measuring the resistance to said mixing.

10. A method as claimed in claim 9 wherein:
    said mixing comprises driving a mixer with an electric motor and controlling the motor with constant speed control equipment; and
    said resistance measuring step comprising measuring the voltage of the constant speed control equipment which is preportional to the consistency of the composition.

11. A method as claimed in claim 1 and further comprising:
    stabilizing the temperature of the composition prior to said cooling.

12. A method as claimed in claim 1 wherein:
    said composition comprises a chocolate-type confection.

13. A method as claimed in claim 2 wherein said tempering zone is provided within a tempering heat exchange zone, and further comprising:
    feeding the composition to at least one pre-heat exchange zone at a first temperature;
    cooling the composition in said at least one pre-heat exchange zone to a second temperature;
    feeding the composition from said at least one pre-heat exchange zone to said tempering heat-exchange zone;
    measuring the second temperature of the composition fed to said tempering heat exchange zone;
    controlling the cooling in said at least one pre-heat exchange zone in response to said second temperature;
    measuring the pressure of the composition at the inlet to said tempering heat exchange zone;
    measuring the pressure of the composition at the outlet of said tampering heat exchange zone;
    determining the pressure difference between said inlet and outlet of said tempering heat exchange zone; and
    controlling cooling of the composition in said tempering heat exchange zone in response to said pressure difference.

14. A chocolate product comprising a self-supporting extruded body of a chocolate composition made by the process comprising:
    cooling a liquid chocolate composition in a tempering zone;
    monitoring the consistency of said composition in the tempering zone during said cooling;
    controlling said cooling in response to the consistency determined by said monitoring to produce said composition having a clay-like consistency; and
    extruding said composition to produce said self-supporting body.

* * * * *